Feb. 5, 1946.   W. P. MASON   2,394,461
MEANS FOR AND METHOD OF MEASURING THE IMPEDANCE
AND REFLECTION COEFFICIENTS OF SURFACES
Filed Oct. 6, 1943

INVENTOR
W. P. MASON
BY John Attall
ATTORNEY

Patented Feb. 5, 1946

2,394,461

UNITED STATES PATENT OFFICE 2,394,461

MEANS FOR AND METHOD OF MEASURING THE IMPEDANCE AND REFLECTION COEFFICIENTS OF SURFACES

Warren P. Mason, West Orange, N. J., assignor to Bell Telephone Laboratories, Incorporated, New York, N. Y., a corporation of New York Application October 6, 1943, Serial No. 505,162

3 Claims. (Cl. 73—104)

This invention relates to electrical measuring devices and particularly to means for measuring impedance and reflection coefficients at ultrasonic frequencies of reflecting or absorbing surfaces used in subaqueous devices.

The object of the invention is to provide a simple means and a method of rapidly determining the impedance and reflection factor of a reflecting or absorbing surface for under-water sound work.

In accordance with this invention a measuring tank provided with energy absorbing walls is employed. A highly directive projector is submerged in the liquid medium with which the tank is filled and then moved slowly toward and away from the surface to be measured which is also suspended in the tank, the critical distances between the projector and the surface being noted to produce maximum and minimum radiation resistance, and the maximum and minimum resistances. The electrical circuits may be so arranged that a simple reading of maximum and minimum current supplied to the projector under a constant applied voltage will give sufficient data from which to calculate the required information. The reflection factor may be determined from the ratio of these readings and the impedance may be determined from this ratio and the critical distance between the projector and the surface.

A feature of the invention is a measuring tank in which a projector may be slowly moved toward and from a surface whose characteristics are to be determined and means for observing the electrical reaction due to the change of distance therebetween.

Another feature of the invention is a method of determining the impedance and reflection factor of a surface which consists of using a directive projector, directing the plane wave produced normally against the surface whose impedance or reflection factor is to be measured, and locating the distances for which a maximum or minimum electrical resistance occurs in the input impedance of the projector, from which data the ratio of the maximum to the minimum measured resistance may be taken and the impedance and reflection factor may be calculated.

Other features will appear hereinafter.

The drawing consists of a single sheet having four figures, as follows.

Figure 1:
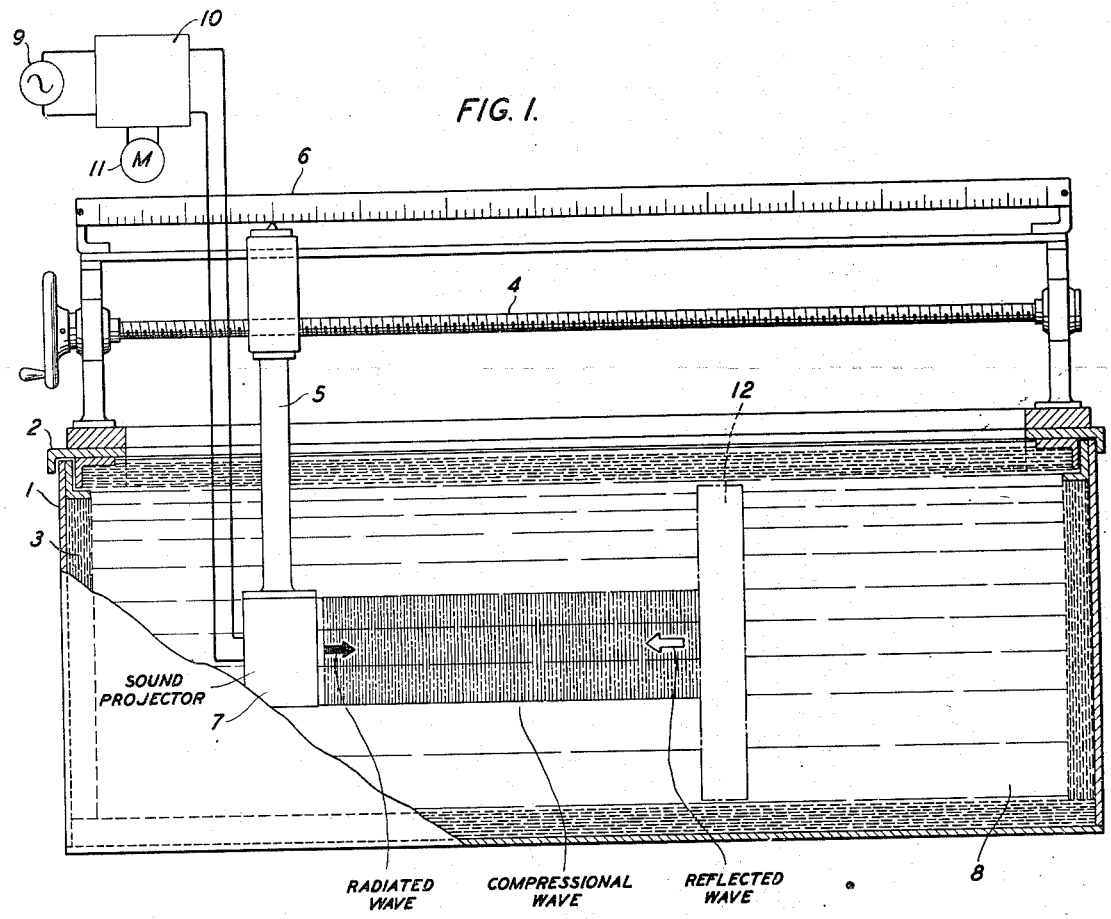
Fig. 1 is a side view, partly in section, of a measuring tank and the arrangement of apparatus whereby data is secured from which the needed information is calculated.

The apparatus consists of a tank 1 with a cover 2, both of which are lined with absorbing material 3 such as a plurality of layers of fine mesh screen. Mounted on the cover 2 is a feed screw 4 by which a post 5 may be moved, and a scale 6 by which the movement of the post may be measured. A highly directive electromechanical transducer 7 is attached to the post 5 and submerged in the liquid 8 with which the tank is filled. The transducer 7 is energized from a source of current 9 through an electrical network 10 to which a meter 11 is connected and which will read the value of the current being fed to the transducer 7.

Figure 2:
Fig. 2 is a sectional representation of one type of surface whose impedance and reflection factors may be determined, this surface consisting of a steel surface covered with a plurality of layers of fine mesh screen acting as an absorbing baffle.
Figure 3:
Fig. 3 is a similar view of another type surface in which a steel plate is covered with a lining of rubber or similar material.
Figure 4:
Fig. 4 is a similar view of a simple sheet of steel or similar material.

Within the tank, the space 12 represents the position in which any one of the surfaces shown in Figs. 2, 3 and 4 may be held in any appropriate manner, the only critical consideration being that the face of the surface must be normal to the direction of the compressional wave transmitted by the transducer 7 so that reflections from the surface will travel back over this same line.

The electrical impedance of the transducer is measured by any conventional method (the electrical network 10 constituting a bridge) and distances on the scale 6 are found for the separation between the transducer and the surface being measured for which the resistance component is a maximum or minimum. Since the electrical resistance of the transducer is determined almost entirely by the radiation resistance of the transducer a simple current reading for a constant applied voltage can also be used. For this case it is only necessary to read the maximum and minimum current for a constant applied voltage and to take their ratio A. As shown hereinafter, if this ratio A is determined, the current or pressure reflection factor is given by the equation:

$$R_F = \frac{A-1}{(\sqrt{A}+1)^2}$$

where A is the ratio of the maximum current to the minimum current, while the power reflection factor is the square of the current reflection factor.

*Evaluation of the acoustic impedance of a surface in terms of the measured electrical impedance ratio and the critical lengths*

The sound from transducer 7 is sufficiently directional so that the equations of a plane wave can be used in determining the reflected velocity or pressure. The impedance of a plane wave transmitting medium terminated in an impedance $Z_T$ is given by the equation: (See "Electromechanical Transducers and Wave Filters," by W. P. Mason, published 1942 by D. Van Nostrand Co., Inc., page 66, equation (2.143)).

$$Z_s = Z_0 \left[ \frac{Z_T \cos \frac{\omega l}{v} + jZ_0 \sin \frac{\omega l}{v}}{Z_0 \cos \frac{\omega l}{v} + jZ_T \sin \frac{\omega l}{v}} \right] \quad (1)$$

if we assume no attenuation for the medium. For this equation $Z_0$ the characteristic impedance will be $\rho v$, where $\rho$ is the density and $v$ the velocity of wave propagation in the medium. In this equation $Z_s$ represents the impedance of a plane wave transmitting medium, $Z_T$ the terminal impedance, $Z_0$ the characteristic impedance, $v$ the velocity of wave propagation in the medium and $l$ the length of the path. In the above formulae the symbol $j$ represents $\sqrt{-1}$ and the symbol $\omega$ represents angular velocity, the product of the angle $2\pi$ and the frequency $f$. If we let $$Z_T = R_T + jX_T \quad (2)$$

where $R_T$ is the terminal resistance and $X_T$ is the terminal reactance, and separate the real and imaginary components, Equation 1 becomes $$\frac{Z_s}{Z_0} = \frac{Z_0 R_T + j \left[ Z_0 X_T \cos \frac{2\omega l}{v} + \left( \frac{Z_0^2 - X_T^2 - R_T^2}{2} \right) \sin \frac{2\omega l}{v} \right]}{Z_0^2 \cos^2 \frac{\omega l}{v} - 2Z_0 X_T \sin \frac{\omega l}{v} \cos \frac{\omega l}{v} + (X_T^2 + R_T^2) \sin^2 \frac{\omega l}{v}} \quad (3)$$

The resistance terms will be a maximum or minimum when the denominator is a minimum or maximum, respectively. Differentiating the denominator by $$\frac{\omega l}{v}$$

and setting equal to zero, we have $$\frac{\partial}{\partial \left( \frac{\omega l}{v} \right)} \left[ Z_0^2 \cos^2 \frac{\omega l}{v} - 2Z_0 X_T \sin \frac{\omega l}{v} \cos \frac{\omega l}{v} + (X_T^2 + R_T^2) \sin^2 \frac{\omega l}{v} \right] =$$

$$-2Z_0^2 \sin \frac{\omega l}{v} \cos \frac{\omega l}{v} - 2Z_0 X_T \left( \cos^2 \frac{\omega l}{v} - \sin^2 \frac{\omega l}{v} \right) + 2(X_T^2 + R_T^2) \sin \frac{\omega l}{v} \cos \frac{\omega l}{v} = 0 \quad (4)$$

This is satisfied by $$\tan \frac{2\omega l_c}{v} = \frac{2Z_0 X_T}{X_T^2 + R_T^2 - Z_0^2} \quad (5)$$

Hence, when the length $l_c$ (the critical length) is adjusted so that Equation 5 is satisfied, the resistance term is a maximum or minimum. Under these conditions the reactance term disappears as can be seen by substituting Equation 5 in the reactance term of Equation 3. The resistances measured at these values can be calculated from the above values by substituting in the values at the critical lengths. Since $$\tan \frac{2\omega l_c}{v} = \frac{2Z_0 X_T}{X_T^2 + R_T^2 - Z_0^2}$$

we find $$\sin^2 \frac{\omega l_c}{v} = \frac{1}{2} \left[ 1 - \frac{(X_T^2 + R_T^2 - Z_0^2)}{\sqrt{(X_T^2 + R_T^2 - Z_0^2)^2 + 4Z_0^2 X_T^2}} \right]$$

$$\cos^2 \frac{\omega l_c}{v} = \frac{1}{2} \left[ 1 + \frac{(X_T^2 + R_T^2 - Z_0^2)}{\sqrt{(X_T^2 + R_T^2 - Z_0^2)^2 + 4Z_0^2 X_T^2}} \right] \quad (6)$$

Substituting these values in Equation 3, we find that the resistances at the critical lengths $l_c$ are $$\frac{Z_s}{Z_0} = \frac{2Z_0 R_T}{(Z_0^2 + X_T^2 + R_T^2) \pm \sqrt{(X_T^2 + R_T^2 - Z_0^2)^2 + 4Z_0^2 X_T^2}}$$

Since the critical distances from the transducer can be measured and the ratio $Z_s/Z_0$ can be determined for maximum and minimum values, enough data is available to determine $X_T$ and $R_T$. If we take the ratio $A$ of the maximum resistance ($R_1$) to the minimum resistance ($R_2$), we have $$A = \frac{R_1}{R_2} =$$

$$\frac{Z_0^2 + X_T^2 + R_T^2 + \sqrt{(X_T^2 + R_T^2 - Z_0^2)^2 + 4Z_0^2 X_T^2}}{Z_0^2 + X_T^2 + R_T^2 - \sqrt{(X_T^2 + R_T^2 - Z_0^2)^2 + 4Z_0^2 X_T^2}} \quad (8)$$

Now since $$\tan \frac{2\omega l_c}{v} = \frac{2Z_0 X_T}{X_T^2 + R_T^2 - Z_0^2} \quad (5)$$

the square root in (8) becomes $$\sqrt{(X_T^2 + R_T^2 - Z_0^2)^2 + 4Z_0^2 X_T^2} = \frac{X_T^2 + R_T^2 - Z_0^2}{\cos \frac{2\omega l_c}{v}} \quad (9)$$

and $$A = \frac{(Z_0^2 + X_T^2 + R_T^2) \cos \frac{2\omega l_c}{v} + (X_T^2 + R_T^2 - Z_0^2)}{(Z_0^2 + X_T^2 + R_T^2) \cos \frac{2\omega l_c}{v} - (X_T^2 + R_T^2 - Z_0^2)} \quad (10)$$

Solving for $X_T^2 + R_T^2$, we find $$X_T^2 + R_T^2 = Z_0^2 \left[ \frac{A + \tan^2 \frac{\omega l_c}{v}}{A \tan^2 \frac{\omega l_c}{v} + 1} \right] \quad (11)$$

Combining this with (5)

$$X_T = \frac{Z_0(A-1) \tan \frac{\omega l_c}{v}}{A \tan^2 \frac{\omega l_c}{v} + 1} \quad (12)$$

Solving for $R_T$ from (11), we find $$R_T = \frac{Z_0 \sqrt{A} \left( \tan^2 \frac{\omega l_c}{v} + 1 \right)}{A \tan^2 \frac{\omega l_c}{v} + 1} \quad (13)$$

The ratio $A$ is easily measured from impedance or current ratios. This and the separation between the reflecting surface and the projector surface at maximum and minimum resistance gives all the data required to evaluate the resistance and reactance components of the reflector.

*Measurement of reflection factor*

The absolute value of the reflection factor can be measured by merely obtaining the ratio of the maximum to the minimum resistance without evaluating the critical length exactly. The current or pressure reflection factor is given by the equation: (See "Electromechanical Transducers and Wave Filters," page 25, equation (2.39)).

$$\text{Reflection factor (current)} = R_F = \frac{Z_0 - Z_T}{Z_0 + Z_T} =$$

$$\frac{Z_0 - R_T - jX_T}{Z_0 + R_T + jX_T} = \frac{Z_0^2 - R_T^2 - X_T^2 - 2jZ_0 X_T}{Z_0^2 + R_T^2 + X_T^2 + 2Z_0 R_T} \quad (14)$$

Inserting the values found above, we have $$R_F = \frac{(A-1)\left(\tan^2\frac{\omega l_c}{v} - 1 + 2j \tan\frac{\omega l_c}{v}\right)}{(\sqrt{A}+1)^2 \left(\tan^2\frac{\omega l_c}{v} + 1\right)} \quad (15)$$

The absolute value of the reflection factor is $$|R_F| = \frac{(A-1)\sqrt{\left(\tan^2\frac{\omega l_c}{v} - 1\right)^2 + 4\tan^2\frac{\omega l_c}{v}}}{(\sqrt{A}+1)^2 \left(\tan^2\frac{\omega l_c}{v} + 1\right)} = \frac{A-1}{(\sqrt{A}+1)^2}$$

Hence to measure the reflection factor it is only necessary to know the ratio of the maximum to minimum resistance without knowing the exact value of $l_c$.

What is claimed is:

1. Means for determining the impedance and reflection factors of a surface comprising a tank having compressional wave absorbing walls and filled with a liquid medium of known propagation and transmission characteristics, means for immersing said surface in said liquid, a plane compressional wave transmitter of variable input, a mounting for said transmitter whereby said transmitter may be immersed in said liquid, and pointed to direct compressional waves normally toward said surface and means for moving said mounting whereby said transmitter may be moved toward and from said surface, and electrical means for measuring the input to said transmitter.

2. Means for determining the impedance and reflection factors of a surface comprising a measuring tank having means for preventing compressional waves reaching a surface under test except over a given route, a liquid medium of known transmission characteristics contained in said tank, means for suspending a surface under test in said liquid with its surface normal to said given route, a source of plane compressional waves of variable input, means for suspending said source in said liquid and directing compressional waves along said given route, means for altering and measuring the distance between said source and said surface and means for measuring the maximum and minimum input to said source whereby the ratio of maximum and minimum input to said source and the critical distances between said source and said surface may be determined.

3. The method of determining the impedance and reflection factors of a surface which consists of placing such a surface and a wave source of variable input, in spaced relation, in a body of liquid of known propagation and transmission characteristics, transmitting from said source plane waves in a direction normal to said surface, varying the distances between said source and said surface to determine critical distances therebetween, measuring the maximum and minimum input to said source as affected by said variation of distance and determining the ratio between a said maximum critical distance and a said minimum critical distance by determining the ratio of a corresponding maximum input to a corresponding minimum input to said source, whereby data for the calculation of said factors is obtained.

WARREN P. MASON.